United States Patent
Zhang et al.

(10) Patent No.: US 10,908,735 B2
(45) Date of Patent: Feb. 2, 2021

(54) ANTI-INTERFERENCE METHOD AND APPARATUS FOR TOUCH PANEL

(71) Applicant: Huawei Technologies Co., Ltd., Shenzhen (CN)

(72) Inventors: Lianming Zhang, Shenzhen (CN); Ke Ai, Shenzhen (CN); Wenfeng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/335,371

(22) PCT Filed: Sep. 21, 2016

(86) PCT No.: PCT/CN2016/099556
§ 371 (c)(1),
(2) Date: Mar. 21, 2019

(87) PCT Pub. No.: WO2018/053700
PCT Pub. Date: Mar. 29, 2018

(65) Prior Publication Data
US 2019/0286277 A1 Sep. 19, 2019

(51) Int. Cl.
*G06F 3/041* (2006.01)

(52) U.S. Cl.
CPC ........ *G06F 3/0418* (2013.01); *G06F 3/04182* (2019.05)

(58) Field of Classification Search
CPC .................................................... G06F 3/0418
(Continued)

(56) References Cited

U.S. PATENT DOCUMENTS

| 8,810,546 B1 | 8/2014 | Kremin et al. |
| 2008/0279324 A1 | 11/2008 | Lin et al. |

(Continued)

FOREIGN PATENT DOCUMENTS

| CN | 102761265 A | 10/2012 |
| CN | 102841715 A | 12/2012 |

(Continued)

OTHER PUBLICATIONS

Foreign Communication From a Counterpart Application, European Application No. 16916441.5, Extended European Search Report dated Aug. 29, 2019, 6 pages.

(Continued)

*Primary Examiner* — Long D Pham
(74) *Attorney, Agent, or Firm* — Conley Rose, P.C.

(57) ABSTRACT

An anti-interference method and apparatus for a touch panel relate to the communications field and improve accuracy of switching an operating frequency by the touch panel. The anti-interference method for the touch panel includes obtaining an operating frequency of a charging adapter and a jitter frequency of the charging adapter, and calculating, using a preset algorithm based on the operating frequency and the jitter frequency, a low-noise interval in which the touch panel is to operate such that the touch panel obtains the low-noise interval, and switches an operating frequency of the touch panel to a frequency in the low-noise interval when interference to the touch panel exceeds a preset range. The low-noise interval is a frequency interval in which the touch panel is to operate when the interference to the touch panel is within the preset range.

20 Claims, 6 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2012/0275199 A1 | 11/2012 | Li et al. | |
| 2013/0121031 A1* | 5/2013 | Sims | H02M 1/44 363/15 |
| 2013/0342171 A1* | 12/2013 | Grivas | G06F 3/044 320/137 |
| 2014/0111467 A1 | 4/2014 | Chen et al. | |
| 2014/0267059 A1 | 9/2014 | Deokar et al. | |
| 2015/0199046 A1 | 7/2015 | Olson et al. | |
| 2015/0370383 A1* | 12/2015 | Oyama | G06F 3/0418 345/173 |
| 2015/0370410 A1 | 12/2015 | Sauer et al. | |
| 2016/0062494 A1* | 3/2016 | Zuber | G06F 3/0418 345/173 |
| 2016/0139730 A1 | 5/2016 | Kida et al. | |

FOREIGN PATENT DOCUMENTS

| | | | |
|---|---|---|---|
| CN | 103091586 | A | 5/2013 |
| CN | 103092408 | A | 5/2013 |
| CN | 103677449 | A | 3/2014 |
| CN | 103995618 | A | 8/2014 |
| CN | 103997096 | A | 8/2014 |
| CN | 105093007 | A | 11/2015 |
| CN | 105144048 | A | 12/2015 |
| CN | 105204684 | A | 12/2015 |
| CN | 105528117 | A | 4/2016 |
| JP | 2016099687 | A | 5/2016 |
| KR | 20160070039 | A | 6/2016 |

OTHER PUBLICATIONS

Machine Translation and Abstract of Chinese Publication No. CN103091586, May 8, 2013, 16 pages.
Machine Translation and Abstract of Chinese Publication No. CN103995618, Aug. 20, 2014, 20 pages.
Machine Translation and Abstract of Chinese Publication No. CN103997096, Aug. 20, 2014, 15 pages.
Machine Translation and Abstract of Chinese Publication No. CN105093007, Nov. 25, 2015, 16 pages.
Machine Translation and Abstract of Chinese Publication No. CN105204684, Dec. 30, 2015, 21 pages.
Machine Translation and Abstract of Chinese Publication No. CN102841715, Dec. 26, 2012, 24 pages.
Machine Translation and Abstract of Chinese Publication No. CN103677449, Mar. 26, 2014, 19 pages.
Machine Translation and Abstract of Chinese Publication No. CN105528117, Apr. 27, 2016, 34 pages.
Foreign Communication From a Counterpart Application, PCT Application No. PCT/CN2016/099556, English Translation of International Search Report dated Apr. 12, 2017, 3 pages.
Foreign Communication From a Counterpart Application, PCT Application No. PCT/CN2016099556, English Translation of Written Opinion dated Apr. 12, 2017, 6 pages.
Foreign Communication From a Counterpart Application, Chinese Application No. 201680082243.1, Chinese Office Action dated Dec. 4, 2019, 6 pages.

* cited by examiner

| An anti-interference apparatus for a touch panel obtains an operating frequency of a charging adapter and a jitter frequency of the charging adapter | S201 |

| The anti-interference apparatus for a touch panel calculates, based on the operating frequency and the jitter frequency, a low-noise interval in which the touch panel is to operate | S202 |

| The anti-interference apparatus for a touch panel selects, from the low-noise interval, a low-noise frequency at which the touch panel is to operate | S203 |

ANTI-INTERFERENCE METHOD AND APPARATUS FOR TOUCH PANEL

CROSS-REFERENCE TO RELATED APPLICATIONS

This application is a U.S. National Stage of International Patent Application No. PCT/CN2016/099556 filed on Sep. 21, 2016, which is hereby incorporated by reference in its entirety.

TECHNICAL FIELD

The present invention relates to the communications field, and in particular, to an anti-interference method and apparatus for a touch panel.

BACKGROUND

A touch panel (Touch Panel, TP) is an induction liquid crystal display apparatus that can receive a signal input by a touch or the like, and is usually disposed on various electronic devices. The TP can replace a mechanical button panel, and generate a vivid video and audio effect by using liquid crystal display images, greatly improving efficiency of operating an electronic device by a user.

When an electronic device on which a TP is disposed is charged by using a charging adapter, the charging adapter is connected to the electronic device. In this case, if the TP is in an operating state, common mode noise of the charging adapter may interfere with the TP and affect normal operation of the TP. Therefore, an operating frequency of the TP needs to be adjusted, so that the TP operates within a frequency band with relatively low noise. An existing anti-interference method for a TP is: The TP first obtains common mode noise of a charging adapter, and determines whether an amplitude of the common mode noise at a current operating frequency of the TP is greater than or equal to a preset threshold. The amplitude of the common mode noise of the charging adapter interferes with the TP in different degrees. If the amplitude of the common mode noise at the current operating frequency of the TP is greater than or equal to the preset threshold, it indicates that the common mode noise of the charging adapter may affect normal operation of the TP. Therefore, the TP needs to adjust the operating frequency of the TP.

However, in the existing anti-interference method for a TP, when adjusting the operating frequency of the TP, the TP can select an operating frequency with lowest noise only from preset operating frequencies or a preset operating band. The operating frequency with the lowest noise that is selected from the preset operating frequencies or the preset operating band is not necessarily an operating frequency with lowest common mode noise.

SUMMARY

Embodiments of the present invention provide an anti-interference method and apparatus for a touch panel, so as to improve accuracy of switching an operating frequency by a touch panel.

To achieve the foregoing objective, the following technical solutions are used in the embodiments of the present invention.

According to a first aspect, an embodiment of the present invention provides an anti-interference method for a touch panel, including:

First, an anti-interference apparatus for a touch panel obtains an operating frequency of a charging adapter and a jitter frequency of the charging adapter. Then, the anti-interference apparatus for a touch panel calculates, by using a preset algorithm based on the operating frequency and the jitter frequency, a low-noise interval in which the touch panel is to operate (that is, a frequency interval in which the touch panel is to operate when interference to the touch panel is within a preset range), so that after obtaining the low-noise interval, the touch panel switches an operating frequency of the touch panel to a frequency in the low-noise interval when the interference to the touch panel exceeds the preset range. As can be learned, compared with a conventional manner in which a touch panel selects an operating frequency with lowest noise from preset operating frequencies or a preset operating band, in the anti-interference method for a touch panel provided in this embodiment of the present invention, the low-noise interval and/or a low-noise frequency is calculated by using the operating frequency of the charging adapter and the jitter frequency of the charging adapter, so that when an amplitude of common mode noise of a current operating frequency is excessively large, the touch panel can directly switch the operating frequency of the touch panel to the low-noise frequency in the low-noise interval, thereby improving accuracy of switching the operating frequency by the touch panel.

Further, the anti-interference apparatus for a touch panel selects, from the low-noise interval, the low-noise frequency at which the touch panel is to operate. The low-noise frequency is any one of all frequencies included in the low-noise interval. As can be learned, the anti-interference apparatus for a touch panel provided in this embodiment of the present invention can select, from the low-noise interval, the low-noise frequency at which the touch panel is to operate, thereby saving a time of selecting the low-noise frequency by the touch panel.

In a first possible implementation, if the charging adapter operates at a fixed frequency and in a frequency jittering mode, the anti-interference apparatus for a touch panel calculates, by using a first formula based on the operating frequency and the jitter frequency, the low-noise interval in which the touch panel is to operate. The first formula is $w_p=f-(2n+1)\Delta f$, where $w_p$ is the low-noise interval, f is the operating frequency, $\Delta f$ is the jitter frequency, and n is a positive integer.

In a second possible implementation, if the charging adapter operates in a valley conduction mode, the anti-interference apparatus for a touch panel calculates, by using a second formula based on the operating frequency and the jitter frequency, the low-noise interval in which the touch panel is to operate. The second formula is $w_p=f-(2n+1)\Delta f$, where $w_p$ is the low-noise interval, f is the operating frequency, $\Delta f$ is the jitter frequency, and n is a positive integer.

Further, if the anti-interference apparatus for a touch panel is disposed in an electronic device, the obtaining, by an anti-interference apparatus for a touch panel, an operating frequency of a charging adapter and a jitter frequency of the charging adapter specifically includes: receiving, by the anti-interference apparatus for a touch panel, the operating frequency of the charging adapter and the jitter frequency of the charging adapter that are sent by the charging adapter.

Further, if the anti-interference apparatus for a touch panel is disposed in the charging adapter, after the anti-interference apparatus for a touch panel selects, from the low-noise interval, the low-noise frequency at which the touch panel is to operate, the method further includes: sending, by the anti-interference apparatus for a touch panel, the low-noise interval, the low-noise frequency, or the low-noise interval and the low-noise frequency to the touch panel.

In the anti-interference method for a touch panel provided in this embodiment of the present invention, the anti-interference apparatus for a touch panel may be disposed in the charging adapter, to send the low-noise interval, the low-noise frequency, or the low-noise interval and the low-noise frequency to the touch panel; or may be disposed in the electronic device, to receive the operating frequency of the charging adapter and the jitter frequency of the charging adapter that are sent by the charging adapter.

Optionally, the low-noise interval in which the touch panel is to operate is a set of a plurality of consecutive or discrete operating frequencies.

According to a second aspect, an embodiment of the present invention provides an anti-interference apparatus for a touch panel, including an obtaining module and a calculation module. The obtaining module is configured to obtain an operating frequency of a charging adapter and a jitter frequency of the charging adapter. The calculation module is configured to: after the obtaining module obtains the operating frequency of the charging adapter and the jitter frequency of the charging adapter, calculate, by using a preset algorithm based on the operating frequency and the jitter frequency, a low-noise interval in which the touch panel is to operate, so that the touch panel obtains the low-noise interval, and switches an operating frequency of the touch panel to a frequency in the low-noise interval when interference to the touch panel exceeds a preset range. The low-noise interval is a frequency interval in which the touch panel is to operate when the interference to the touch panel is within the preset range.

Further, the anti-interference apparatus for a touch panel further includes a selection module, configured to select, from the low-noise interval after the calculation module calculates the low-noise interval in which the touch panel is to operate, a low-noise frequency at which the touch panel is to operate.

For a technical effect of the anti-interference apparatus for a touch panel provided in this embodiment of the present invention, refer to a technical effect of the anti-interference apparatus for a touch panel described in the anti-interference method for a touch panel performed by the anti-interference apparatus for a touch panel according to the first aspect, and details are not described herein again.

Further, the charging adapter operates at a fixed frequency and in a frequency jittering mode. The calculation module is specifically configured to calculate, by using a first formula based on the operating frequency and the jitter frequency, the low-noise interval in which the touch panel is to operate. The first formula is $w_p = f - (2n+1)\Delta f$, where $w_p$ is the low-noise interval, f is the operating frequency, $\Delta f$ is the jitter frequency, and n is a positive integer.

Further, the charging adapter operates in a valley conduction mode. The calculation module is specifically configured to calculate, by using a second formula based on the operating frequency and the jitter frequency, the low-noise interval in which the touch panel is to operate. The second formula is $w_p = f - (2n+1)\Delta f$, where $w_p$ is the low-noise interval, f is the operating frequency, $\Delta f$ is the jitter frequency, and n is a positive integer.

Further, the anti-interference apparatus for a touch panel is disposed in an electronic device. The obtaining module is specifically configured to receive the operating frequency of the charging adapter and the jitter frequency of the charging adapter that are sent by the charging adapter.

Further, the anti-interference apparatus for a touch panel is disposed in the charging adapter, and the anti-interference apparatus for a touch panel further includes a sending module, configured to: after the calculation module calculates the low-noise interval in which the touch panel is to operate, send the low-noise interval, the low-noise frequency, or the low-noise interval and the low-noise frequency to the touch panel.

According to a third aspect, an embodiment of the present invention further provides an anti-interference apparatus for a touch panel. The anti-interference apparatus for a touch panel includes a memory, a processor, a communications interface, and a system bus. The memory, the processor, and the communications interface are connected by using the system bus, the memory is configured to store a computer instruction, and the processor is configured to execute the computer instruction stored in the memory, so that the anti-interference apparatus for a touch panel performs the anti-interference method for a touch panel according to the first aspect.

For a technical effect of the anti-interference apparatus for a touch panel provided in this embodiment of the present invention, refer to the technical effect of the anti-interference apparatus for a touch panel described in the anti-interference method for a touch panel performed by the anti-interference apparatus for a touch panel according to the first aspect, and details are not described herein again.

According to a fourth aspect, an embodiment of the present invention further provides a software product. The software product includes a computer instruction for implementing an anti-interference method for a touch panel. The computer instruction may be stored in a readable storage medium. A processor can read the computer instruction from the readable storage medium and execute the computer instruction, so that the processor implements the anti-interference method for a touch panel.

The embodiments of the present invention provide the anti-interference method and apparatus for a touch panel. The operating frequency of the charging adapter and the jitter frequency of the charging adapter are obtained. The low-noise interval in which the touch panel is to operate is calculated by using the preset algorithm based on the operating frequency and the jitter frequency. The low-noise interval is a frequency interval in which the touch panel is to operate when the interference to the touch panel is within the preset range. Based on the descriptions of the foregoing embodiments, the low-noise interval and/or the low-noise frequency is calculated by using the operating frequency of the charging adapter and the jitter frequency of the charging adapter, so that when an amplitude of common mode noise of a current operating frequency is excessively large, the touch panel can directly switch the operating frequency of the touch panel to the low-noise frequency in the low-noise interval, thereby improving accuracy of switching the operating frequency by the touch panel.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following descriptions show merely some embodiments of the present invention.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

In the following descriptions, to illustrate rather than limit, specific details such as a particular system structure, an interface, and a technology are provided to make a thorough understanding of this application. However, persons skilled in the art should know that this application may be practiced in other embodiments without these specific details. In other cases, detailed descriptions of well-known apparatuses, circuits, and methods are omitted, so that this application is described without being obscured by unnecessary details.

In addition, terms "include" and "have" and any transformation thereof in the specification, claims, and accompanying drawings of this application are intended to cover non-exclusive including. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments of this application can be implemented as a process (a method), a computing system, or a product such as a computer program product or a computer-readable medium that is implemented by a computer. The computer program product may be a computer storage medium readable by a computer system and encoding a computer program that includes instructions for causing a computer or a computing system to perform an example process. The computer-readable storage medium is a non-transitory computer-readable storage device. For example, the computer-readable storage medium may be implemented by one or more of a volatile computer memory, a non-volatile memory, a hard disk drive, a flash drive, a floppy disk or a compact disc, and a similar medium.

The term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Moreover, in the specification, claims, and accompanying drawings of this application, the terms "first", "second", and so on are intended to distinguish between different objects but do not indicate a particular order.

The technical solutions provided in the embodiments of the present invention may be applied to a scenario of charging various electronic devices on which a TP is disposed. When charging an electronic device, a charging adapter may be connected to the electronic device by using a data line. An anti-interference apparatus for a TP is disposed in the charging adapter or the electronic device.

In the embodiments of the present invention, the charging adapter or the electronic device obtains a strength of common mode noise generated by the current charging adapter, and then determines whether the obtained strength of the common mode noise is greater than or equal to a preset threshold. When it is determined that the strength of the common mode noise is greater than or equal to the preset threshold, the anti-interference apparatus for a TP calculates, based on an operating frequency of the charging adapter and a jitter frequency of the charging adapter, a low-noise interval or a low-noise frequency for a touch panel to operate in or at. The low-noise interval or the low-noise frequency is used to adjust an operating frequency of the touch panel, so that the touch panel operates at a frequency at which a strength of common mode noise newly generated by the charging adapter is less than the preset threshold.

When the anti-interference apparatus for a TP is disposed in the charging adapter, after calculating, based on the operating frequency of the charging adapter and the jitter frequency of the charging adapter, the low-noise interval or the low-noise frequency for the touch panel to operate in or at, the anti-interference apparatus for a TP can send the low-noise interval or the low-noise frequency to the electronic device, so that the TP in the electronic device selectively switches the operating frequency of the TP based on the low-noise interval or the low-noise frequency. If the anti-interference apparatus for a TP is disposed in the electronic device, the anti-interference apparatus for a TP can receive the operating frequency of the charging adapter and the jitter frequency of the charging adapter that are sent by the charging adapter, so as to calculate, based on the operating frequency of the charging adapter and the jitter frequency of the charging adapter, the low-noise interval in which the touch panel is to operate, and select the low-noise frequency from the low-noise interval, for the TP in the electronic device to selectively switch the operating frequency of the TP.

It may be understood that the low-noise interval in which the touch panel is to operate is a frequency interval in which the touch panel is to operate when interference to the touch panel is within a preset range. That is, the operating frequency of the touch panel is in a frequency interval in which the strength of the common mode noise newly generated by the charging adapter is less than the preset threshold. The low-noise frequency is any one of all frequencies included in the low-noise interval.

Further, a communications unit may further be disposed in the electronic device. The communications unit is configured to send the low-noise interval and the low-noise frequency for the touch panel to operate in and at to the TP, where the low-noise interval and the low-noise frequency are calculated by the anti-interference apparatus for a TP.

The electronic device (also referred to as a terminal device) may be a wireless terminal or a wired terminal. The wireless terminal may be a device that provides voice and/or data connectivity for a user, a handheld device having a wireless connection function, or another processing device connected to a wireless modem. The wireless terminal may communicate with another apparatus by means of WiFi, Bluetooth, infrared, and a radio access network (such as RAN, Radio Access Network). The wireless terminal may be a mobile terminal, such as a mobile phone (or referred to as a "cellular" phone) and a computer with a mobile terminal, and for example, may be a portable, pocket-sized, handheld, computer built-in, or in-vehicle mobile apparatus, which exchanges voice and/or data with the radio access network. The wireless terminal may also be referred to as a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), or user equipment (User Equipment).

Figure 1:
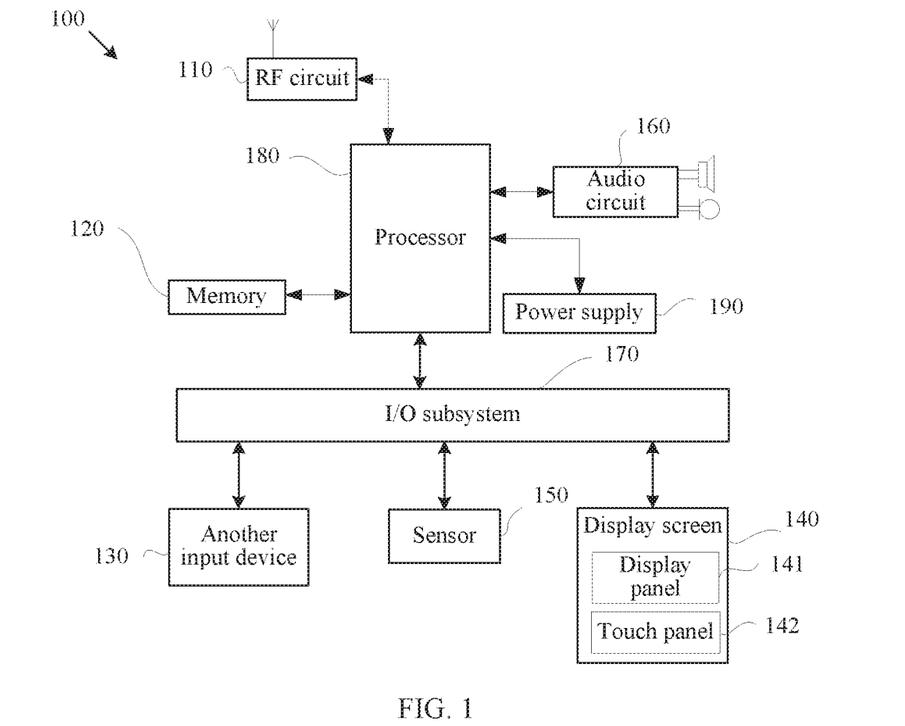
FIG. 1 a diagram of a general-purpose hardware architecture of a smartphone according to an embodiment of the present invention.

For example, a general-purpose hardware architecture of a smartphone is described by using an example in which an electronic device is the smartphone. As shown in FIG. 1, the smartphone 100 includes components such as a radio frequency (Radio Frequency, RF) circuit 110, a memory 120, another input device 130, a display screen 140, a sensor 150, an audio circuit 160, an I/O subsystem 170, a processor 180, and a power supply 190. Persons skilled in the art may understand that the structure of the smartphone 100 shown in FIG. 1 does not constitute a limitation on a mobile phone, and the mobile phone may include more or fewer components than those shown in the figure, or some components may be combined, some components may be disassembled, or different component arrangements may be used. Persons skilled in the art may understand that the display screen 140 belongs to a user interface (UI, User Interface), and the smartphone 100 may include more or fewer components than those shown in the figure.

It should be particularly noted that the display screen 140 may be configured to display information entered by a user or information provided for a user and various menus on the smartphone 100, and may further receive user input. Specifically, the display screen 140 may include a display panel 141 and a touch panel 142. The touch panel 142, also referred to as a touchscreen, a touch-sensitive screen, or the like, may collect a touch or non-touch operation of a user on or near the touch panel (such as an operation performed by a user on or near the touch panel 142 by using any suitable object or accessory such as a finger or a stylus, or may include a motion sensing operation, where the operation includes an operation type such as a single-point control operation or a multi-point control operation), and drive a corresponding connection apparatus based on a preset program. Optionally, the touch panel 142 may include two parts: a touch detection apparatus and a touch controller. The touch detection apparatus detects a touch position and a posture of the user, detects a signal generated by the touch operation, and transfers the signal to the touch controller. The touch controller receives touch information from the touch detection apparatus, converts the touch information into information that can be processed by the processor, and sends the information to the processor 180; and can receive and execute a command sent by the processor 18. In addition, the touch panel 142 may be implemented in a plurality of types, such as a resistive type, a capacitive type, an infrared type, and a surface acoustic wave type, or may be implemented by using any technology developed in the future. Further, the touch panel 142 may cover the display panel 141. The user may perform, based on content displayed on the display panel 141 (the displayed content includes, but is not limited to, a soft keyboard, a virtual mouse, a virtual key, an icon, and the like), an operation on or near the touch panel 142 covering the display panel 141. After detecting the operation on or near the touch panel 142, the touch panel 142 transfers the operation to the processor 180 by using the I/O subsystem 170 to determine the user input. Subsequently, the processor 180 provides corresponding visual output on the display panel 141 by using the I/O subsystem 170 based on the user input. Although in FIG. 1, the touch panel 142 and the display panel 141 are used as two separate components to implement input and output functions of the smartphone 100, in some embodiments, the touch panel 142 and the display panel 141 may be integrated to implement the input and output functions of the smartphone 100.

A touch panel mentioned in the following embodiments of the present invention is usually the touch panel 142 shown in FIG. 1, or may be another apparatus having the functions of the touch panel 142. This is not limited in the present invention.

Embodiment 1

Figure 2:
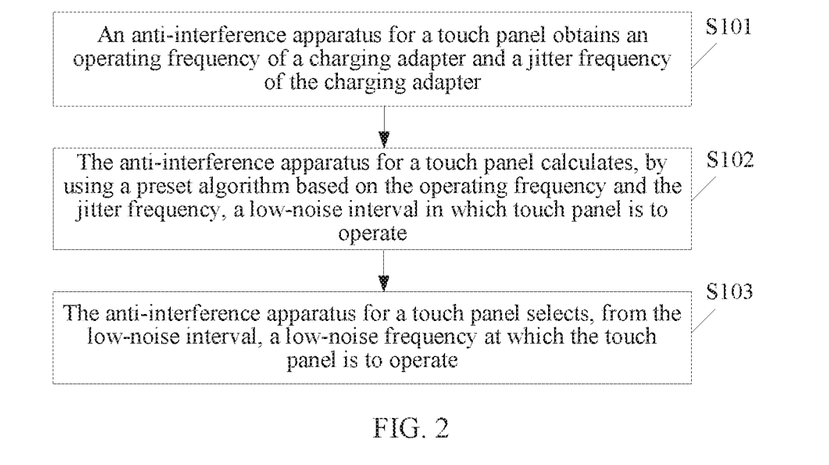
FIG. 2 is a first schematic flowchart of an anti-interference method for a touch panel according to an embodiment of the present invention.

This embodiment of the present invention provides an anti-interference method for a touch panel. In a first possible implementation, an anti-interference apparatus for a touch panel is disposed in an electronic device. As shown in FIG. 2, the method includes S101 and S102.

S101: The anti-interference apparatus for a touch panel obtains an operating frequency of a charging adapter and a jitter frequency of the charging adapter.

It may be understood that the operating frequency of the charging adapter mentioned in this embodiment of the present invention is an operating frequency of a switch chip of the charging adapter, and the jitter frequency of the charging adapter is a jitter frequency of the switch chip of the charging adapter.

Figure 3:
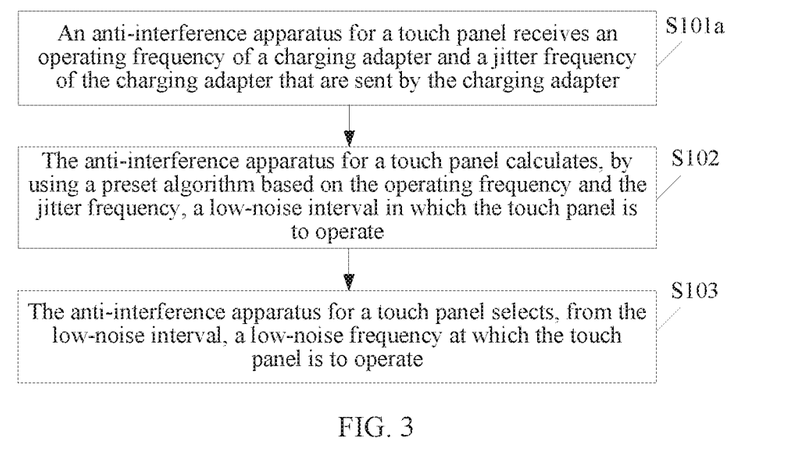
FIG. 3 is a second schematic flowchart of an anti-interference method for a touch panel according to an embodiment of the present invention.

Specifically, as shown in FIG. 3, step S101 may include S101a:

S101a: The anti-interference apparatus for a touch panel receives the operating frequency of the charging adapter and the jitter frequency of the charging adapter that are sent by the charging adapter.

Because the anti-interference apparatus for a touch panel is disposed in the electronic device, the anti-interference apparatus for a touch panel can receive the operating frequency of the charging adapter and the jitter frequency of the charging adapter that are proactively reported by the charging adapter. Alternatively, the anti-interference apparatus for a touch panel may send a request message to the charging adapter, so that the charging adapter sends the operating frequency of the charging adapter and the jitter frequency of the charging adapter to the anti-interference apparatus for a touch panel based on the request message.

S102: The anti-interference apparatus for a touch panel calculates, by using a preset algorithm based on the operating frequency and the jitter frequency, a low-noise interval in which the touch panel is to operate, so that the touch panel obtains the low-noise interval, and switches an operating frequency of the touch panel to a frequency in the low-noise interval when interference to the touch panel exceeds a preset range.

The low-noise interval is a frequency interval in which the touch panel is to operate when the interference to the touch panel is within the preset range, and the low-noise interval is a set of a plurality of consecutive or discrete operating frequencies. A low-noise frequency is any one of all frequencies included in the low-noise interval. It may be understood that a user may set the preset range based on an actual requirement. This is not limited in the present invention.

It should be noted that the charging adapter mentioned in this embodiment of the present invention may operate in different operating modes, for example, at a fixed frequency and in a frequency jittering mode and a valley conduction mode.

Figure 4:
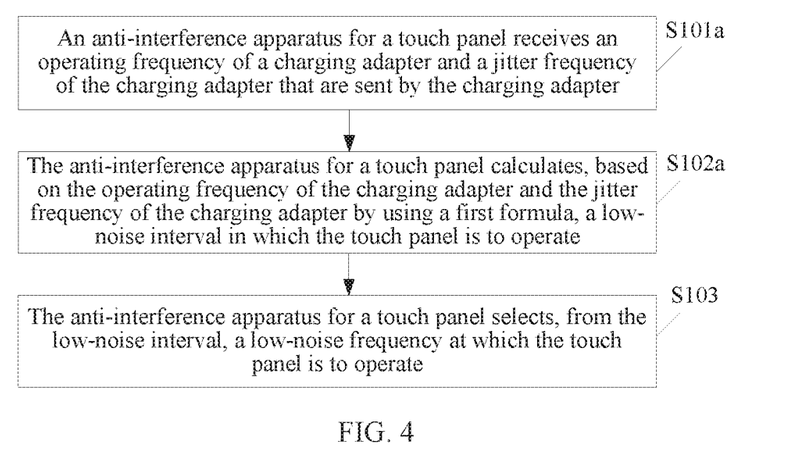
FIG. 4 is a third schematic flowchart of an anti-interference method for a touch panel according to an embodiment of the present invention.

For example, the charging adapter operates at the fixed frequency and in the frequency jittering mode. As shown in FIG. 4, step S102 may include S102a:

S102a: The anti-interference apparatus for a touch panel calculates, by using a first formula based on the operating frequency of the charging adapter and the jitter frequency of the charging adapter, the low-noise interval in which the touch panel is to operate. The first formula is $w_p = f - (2n+1)\Delta f$, where $w_p$ is the low-noise interval in which the touch panel is to operate, f is the operating frequency of the charging adapter, $\Delta f$ is the jitter frequency of the charging adapter, and n is a positive integer.

Figure 5:
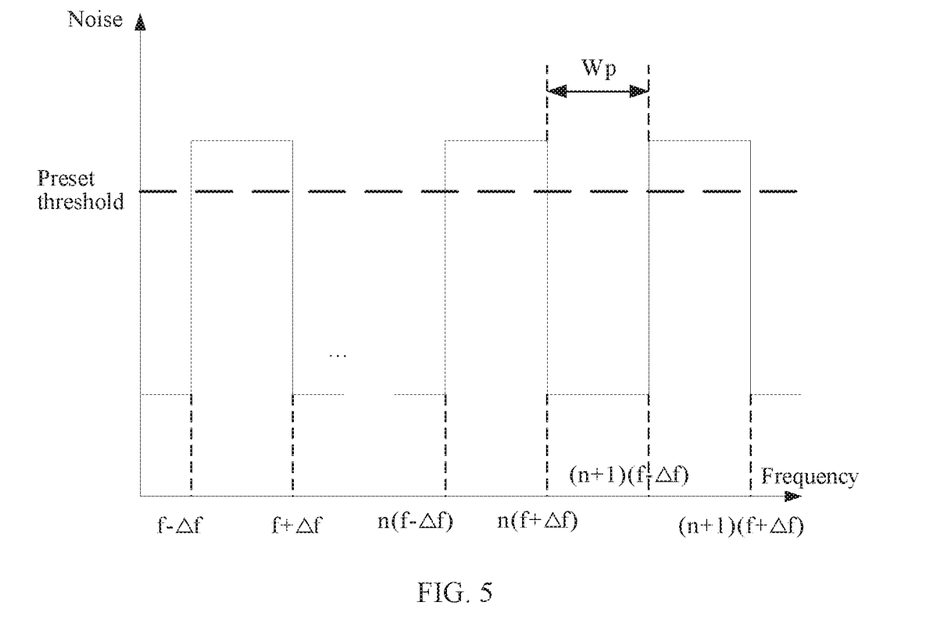
FIG. 5 is a diagram of a relationship between frequencies and noise when a charging adapter operates at a fixed frequency and in a frequency jittering mode according to an embodiment of the present invention.

It may be understood that FIG. 5 is a diagram of a relationship between frequencies and noise when the charging adapter operates at the fixed frequency and in the frequency jittering mode. The dashed line in a horizontal direction in the figure represents the preset range. The low-noise interval in which the touch panel is to operate is a set of a plurality of operating frequencies below the dashed line.

As can be learned from FIG. 5, the low-noise interval in which the touch panel is to operate may be calculated by using the first formula, that is:

$$w_p = (n+1)(f - \Delta f) - n(f + \Delta f)$$
$$= nf + f - n\Delta f - nf - n\Delta f$$
$$= f - (2n+1)\Delta f$$

where $w_p$ is the low-noise interval in which the touch panel is to operate, f is the operating frequency of the charging adapter, $\Delta f$ is the jitter frequency of the charging adapter, and n is a positive integer.

Figure 6:
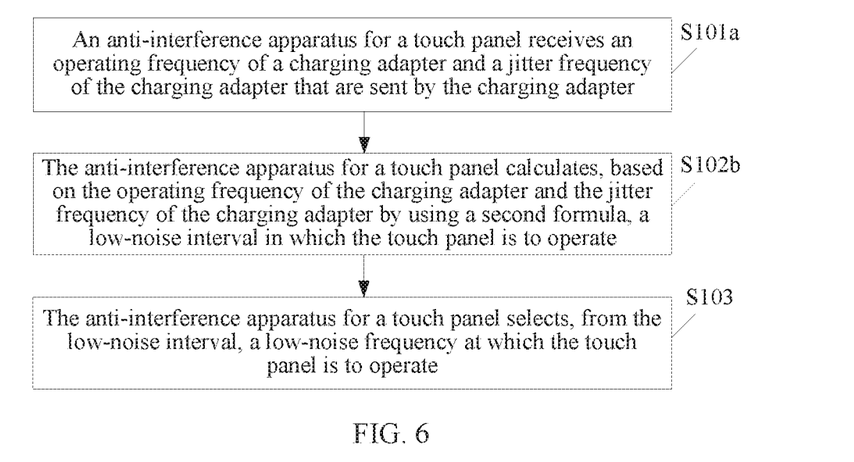
FIG. 6 is a fourth schematic flowchart of an anti-interference method for a touch panel according to an embodiment of the present invention.

For another example, the charging adapter operates in the valley conduction mode. As shown in FIG. 6, step S102 may include S102b:

S102b: The anti-interference apparatus for a touch panel calculates, by using a second formula based on the operating frequency of the charging adapter and the jitter frequency of the charging adapter, the low-noise interval in which the touch panel is to operate. The second formula is $w_p = f - (2n+1)\Delta f$, where $w_p$ is the low-noise interval in which the touch panel is to operate, f is the operating frequency of the charging adapter, $\Delta f$ is the jitter frequency of the charging adapter, and n is a positive integer.

Figure 7:
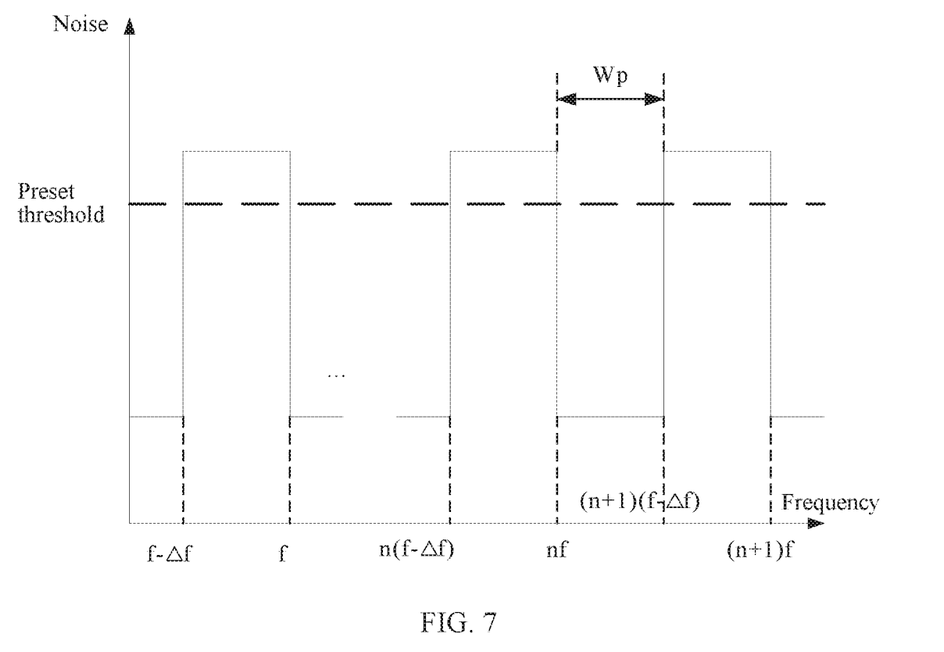
FIG. 7 is a diagram of a relationship between frequencies and noise when a charging adapter operates in a valley conduction mode according to an embodiment of the present invention.

It may be understood that FIG. 7 is a diagram of a relationship between frequencies and noise when the charging adapter operates in the valley conduction mode. The dashed line in a horizontal direction in the figure represents the preset range. The low-noise interval in which the touch panel is to operate is a set of a plurality of operating frequencies below the dashed line.

As can be learned from FIG. 7, the low-noise interval in which the touch panel is to operate may be calculated by using the second formula, that is:

$$w_p = (n+1)(f - \Delta f) - nf$$
$$= nf + f - f - n\Delta f - \Delta f - nf$$
$$= f - (n+1)\Delta f$$

where $w_p$ is the low-noise interval in which the touch panel is to operate, f is the operating frequency of the charging adapter, $\Delta f$ is the jitter frequency of the charging adapter, and n is a positive integer.

It should further be noted that according to the method for calculating the low-noise interval in which the touch panel is to operate mentioned in this embodiment of the present invention, because n is any positive integer, the calculated low-noise interval in which the touch panel is to operate may include a plurality of discrete frequency bands. When selecting, from the low-noise interval, a low-noise frequency at which the touch panel is to operate, the anti-interference apparatus for a touch panel may select the low-noise frequency from one of the frequency bands, or may select the low-noise frequency from different frequency bands. This is not limited in the present invention. Certainly, it may be understood that when selecting, from the low-noise interval, the low-noise frequency at which the touch panel is to operate, the anti-interference apparatus for a touch panel needs to consider an operating band of the touch panel. That is, the low-noise frequency at which the touch panel is to operate and that is selected by the anti-interference apparatus for a touch panel from the low-noise interval needs to be within the operating band of the touch panel.

Optionally, the touch panel can also select, from the low-noise interval, a low-noise frequency to be switched to. In addition, the touch panel also needs to consider the operating band of the touch panel during selection. That is, the touch panel selects the low-noise interval and/or the low-noise frequency within the operating band of the touch panel. Further, optionally, when calculating the low-noise interval, the anti-interference apparatus for a touch panel can consider the operating band of the touch panel. That is, the anti-interference apparatus for a touch panel predetermines a value of n.

Optionally, the anti-interference method for a touch panel provided in this embodiment of the present invention may further include step S103:

S103: The anti-interference apparatus for a touch panel selects, from the low-noise interval, the low-noise frequency at which the touch panel is to operate.

It should be noted that the low-noise frequency at which the touch panel is to operate may be any frequency in the low-noise interval. A time of selecting the low-noise frequency by the touch panel can be saved by means of the step in which the anti-interference apparatus for a touch panel selects, from the low-noise interval, the low-noise frequency at which the touch panel is to operate. Preferably, the anti-interference apparatus for a touch panel may select, as the low-noise frequency at which the touch panel is to operate, a frequency that is in the low-noise interval and at which interference from common mode noise of the charging adapter to the touch panel is minimum. This is not limited in the present invention.

According to the anti-interference method for a touch panel provided in this embodiment of the present invention, the anti-interference apparatus for a touch panel can obtain the operating frequency of the charging adapter and the jitter frequency of the charging adapter, and calculate, based on the operating frequency of the charging adapter and the jitter frequency of the charging adapter, the low-noise interval in which the touch panel is to operate, so as to select, from the low-noise frequency at which the touch panel is to operate. Compared with a conventional method for adjusting an operating frequency of a TP, in this embodiment, the low-noise interval and/or the low-noise frequency is calculated by using the operating frequency of the charging adapter and the jitter frequency of the charging adapter, so that when an amplitude of common mode noise of a current operating frequency is excessively large, the touch panel can directly switch the operating frequency of the touch panel to the low-noise frequency in the low-noise interval, thereby improving accuracy of switching the operating frequency by the touch panel.

Figure 8:
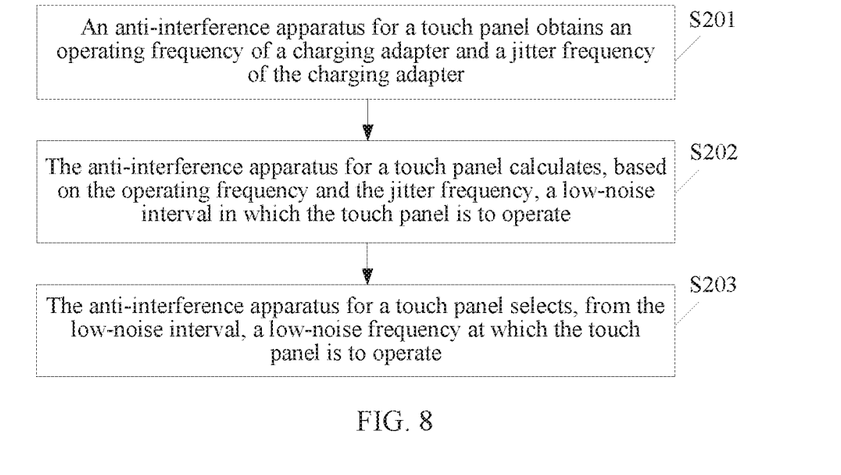
FIG. 8 is a fifth schematic flowchart of an anti-interference method for a touch panel according to an embodiment of the present invention.

In a second possible implementation, an anti-interference apparatus for a touch panel is disposed in a charging adapter. As shown in FIG. 8, the method includes the following steps:

S201: The anti-interference apparatus for a touch panel obtains an operating frequency of the charging adapter and a jitter frequency of the charging adapter.

S202: The anti-interference apparatus for a touch panel calculates, based on the operating frequency and the jitter frequency, a low-noise interval in which the touch panel is to operate.

S203: The anti-interference apparatus for a touch panel selects, from the low-noise interval, a low-noise frequency at which the touch panel is to operate.

Specifically, specific implementations of steps S201 to S203 have been described in detail in steps S101 to S103. For brevity, details are not described herein again. In addition, a difference between step S201 and step S101 is that because the anti-interference apparatus for a touch panel is disposed in the charging adapter, no data sending and receiving processes need to be performed between the anti-interference apparatus for a touch panel and the charging adapter, and the anti-interference apparatus for a touch panel can directly read the operating frequency of the charging adapter and the jitter frequency of the charging adapter from the charging adapter.

Figure 9:
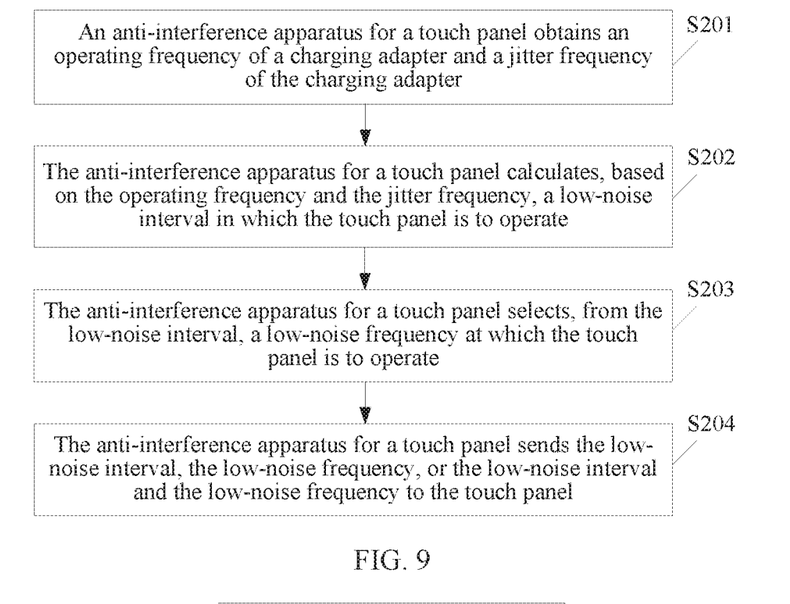
FIG. 9 is a sixth schematic flowchart of an anti-interference method for a touch panel according to an embodiment of the present invention.

Further, as shown in FIG. 9, the method further includes step S204:

S204: The anti-interference apparatus for a touch panel sends the low-noise interval, the low-noise frequency, or the low-noise interval and the low-noise frequency to the touch panel.

Because the anti-interference apparatus for a touch panel is disposed in the charging adapter, after obtaining the low-noise interval and/or the low-noise frequency, the anti-interference apparatus for a touch panel needs to send the low-noise interval and/or the low-noise frequency to the touch panel, so that the touch panel adjusts an operating frequency of the touch panel based on the low-noise interval and the low-noise frequency. Specifically, the low-noise interval and the low-noise frequency may be sent to an electronic device, and are transmitted to the touch panel by using an internal communications interface of the electronic device.

It should be noted that if the anti-interference apparatus for a touch panel sends only the low-noise interval to the touch panel, the anti-interference apparatus for a touch panel does not need to perform step S203. After the anti-interference apparatus for a touch panel completes step S202, and sends the low-noise interval to the touch panel, the touch panel can select the low-noise frequency from the low-noise interval. If the anti-interference apparatus for a touch panel sends the low-noise frequency, or the low-noise interval and the low-noise frequency to the electronic device, a time of selecting the low-noise frequency by the touch panel is saved.

In the foregoing embodiment, before the anti-interference apparatus for a touch panel obtains the operating frequency of the charging adapter and the jitter frequency of the charging adapter, the anti-interference method for a touch panel may further include: obtaining, by the anti-interference apparatus for a touch panel, a strength of common mode noise generated by the current charging adapter, and determining whether the obtained strength of the common mode noise is greater than or equal to a preset threshold. When determining that the strength of the common mode noise is greater than or equal to the preset threshold, the anti-interference apparatus for a touch panel calculates, based on the operating frequency of the charging adapter and the jitter frequency of the charging adapter, the low-noise interval or the low-noise frequency for the touch panel to operate in or at.

Alternatively, when the touch panel determines that the strength of the common mode noise at the current operating frequency of the touch panel is greater than or equal to the preset threshold, after sending the low-noise interval and/or the low-noise frequency to the touch panel, the anti-interference apparatus for a touch panel the operating frequency of the touch panel to a frequency in the low-noise interval or to the low-noise frequency.

This embodiment of the present invention provides the anti-interference method for a touch panel. The operating frequency of the charging adapter and the jitter frequency of the charging adapter are obtained. The low-noise interval in which the touch panel is to operate is calculated based on the operating frequency and the jitter frequency. The low-noise frequency at which the touch panel is to operate is selected from the low-noise interval. Compared with a conventional method for adjusting an operating frequency of a TP, in this embodiment, the low-noise interval and/or the low-noise frequency is calculated by using the operating frequency of the charging adapter and the jitter frequency of the charging adapter, so that when an amplitude of common mode noise of a current operating frequency is excessively large, the touch panel can directly switch the operating frequency of the touch panel to the low-noise frequency in the low-noise interval, thereby improving accuracy of switching the operating frequency by the touch panel.

Embodiment 2

This embodiment of the present invention provides an anti-interference apparatus for a touch panel. The anti-interference apparatus for a touch panel may be disposed in an electronic device, or may be disposed in a charging adapter. The anti-interference apparatus for a touch panel is configured to perform the steps performed by the anti-interference apparatus for a touch panel in the foregoing anti-interference method for a touch panel. The anti-interference apparatus for a touch panel provided in this embodiment of the present invention may include modules corresponding to the corresponding steps.

In this embodiment of the present invention, functional modules of the anti-interference apparatus for a touch panel may be divided based on the foregoing method example. For example, the functional modules may be divided corresponding to various functions, or two or more functions may be integrated in one functional module. The integrated module may be implemented in a form of hardware, or may be implemented in a form of a software functional module. In this embodiment of the present invention, the division of the modules is merely an example, and is merely division of logical functions. During actual implementation, there may be another division manner.

Figure 10:
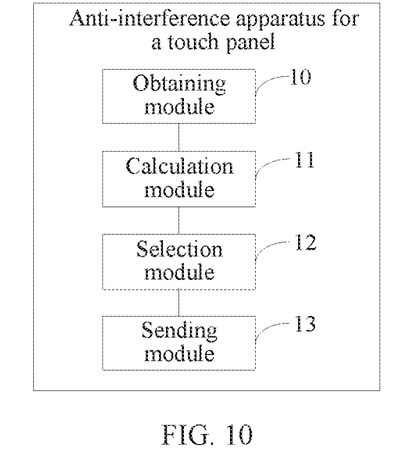
FIG. 10 is a first schematic structural diagram of an anti-interference apparatus for a touch panel according to an embodiment of the present invention.

When the functional modules are divided corresponding to the functions, FIG. 10 is a possible schematic structural diagram of the anti-interference apparatus for a touch panel in the foregoing embodiment. As shown in FIG. 10, the anti-interference apparatus for a touch panel includes an obtaining module 10 and a calculation module 11. When the anti-interference apparatus for a touch panel is disposed in the electronic device, the obtaining module 10 is configured to support the anti-interference apparatus for a touch panel in performing S101 in FIG. 2 and S101a in FIG. 3, FIG. 4, and FIG. 6. That is, the obtaining module 10 is configured to receive an operating frequency of the charging adapter and a jitter frequency of the charging adapter that are sent by the charging adapter. When the anti-interference apparatus for a touch panel is disposed in the charging adapter, the obtaining module 10 is configured to support the anti-interference apparatus for a touch panel in performing S201 in FIG. 8 and FIG. 9. That is, the obtaining module 10 is configured to read the operating frequency of the charging adapter and the jitter frequency of the charging adapter from the charging adapter. The calculation module 11 is configured to support the anti-interference apparatus for a touch panel in performing S102 in FIG. 2, FIG. 3, FIG. 4, and FIG. 6 and S202 in FIG. 8 and FIG. 9. Further, the anti-interference apparatus for a touch panel further includes a selection module 12, configured to support the anti-interference apparatus for a touch panel in performing S103 in FIG. 2, FIG. 3, FIG. 4, and FIG. 6 and S203 in FIG. 8 and FIG. 9. All related content in the steps in the foregoing method embodiment may be cited in function descriptions of corresponding functional modules. Details are not described herein again.

When the anti-interference apparatus for a touch panel is disposed in the charging adapter, the anti-interference apparatus for a touch panel further includes a sending module 13, configured to support the anti-interference apparatus for a touch panel in performing S204 in FIG. 9. That is, the sending module 13 is configured to send a low-noise interval, a low-noise frequency, or a low-noise interval and a low-noise frequency to a touch panel.

The anti-interference apparatus for a touch panel may further include a common mode noise determining module, configured to: obtain a strength of common mode noise generated by the current charging adapter, determine whether the obtained strength of the common mode noise is greater than or equal to a preset threshold, and when determining that the strength of the common mode noise is greater than or equal to the preset threshold, trigger the obtaining unit to obtain the operating frequency of the charging adapter and the jitter frequency of the charging adapter.

Figure 11:
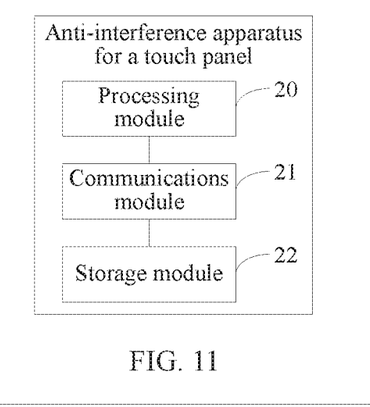
FIG. 11 is a second schematic structural diagram of an anti-interference apparatus for a touch panel according to an embodiment of the present invention.

When an integrated unit is used. FIG. 11 is a possible schematic structural diagram of the anti-interference apparatus for a touch panel in the foregoing embodiment. The anti-interference apparatus for a touch panel may still be disposed in the electronic device, or may be disposed in the charging adapter. As shown in FIG. 11, the anti-interference apparatus for a touch panel includes a processing module 20 and a communications module 21. The processing module 20 is configured to control and manage an action of the anti-interference apparatus for a touch panel. For example, the processing module 20 is configured to support the anti-interference apparatus for a touch panel in performing S102 and S103 in FIG. 2. FIG. 3, FIG. 4, and FIG. 6 and S202 and S203 in FIG. 8 and FIG. 9, and/or is configured to perform another process of a technology described in the specification. The communications module 21 is configured to support the anti-interference apparatus for a touch panel in communicating with another communications device. For example, the communications module 21 is configured to support the anti-interference apparatus for a touch panel in performing S101 in FIG. 2, S101a in FIG. 3, FIG. 4, and FIG. 6, S201 in FIG. 8 and FIG. 9, and S204 in FIG. 9. That is, when the anti-interference apparatus for a touch panel is disposed in the electronic device, the communications module 21 is configured to receive an operating frequency of the charging adapter and a jitter frequency of the charging adapter that are sent by the charging adapter. When the anti-interference apparatus for a touch panel is disposed in the charging adapter, the communications module 21 is configured to send a low-noise interval, a low-noise frequency, or a low-noise interval and a low-noise frequency to a touch panel. The anti-interference apparatus for a touch panel may further include a storage module 22, configured to store the low-noise interval and the low-noise frequency that are mentioned in the foregoing embodiment, and may further be configured to store program code and data of the anti-interference apparatus for a touch panel.

The processing module 20 may be a processor or a controller, for example, a central processing unit (Central Processing Unit, CPU) or a digital signal processor (Digital Signal Processor, DSP). The controller/processor can implement or perform various examples of logic blocks, modules, and circuits described with reference to content disclosed in this application. The communications module 21 may be a transceiver, a transmission/receiving circuit, a communications interface, or the like. The storage module 22 may be a memory.

Figure 12:
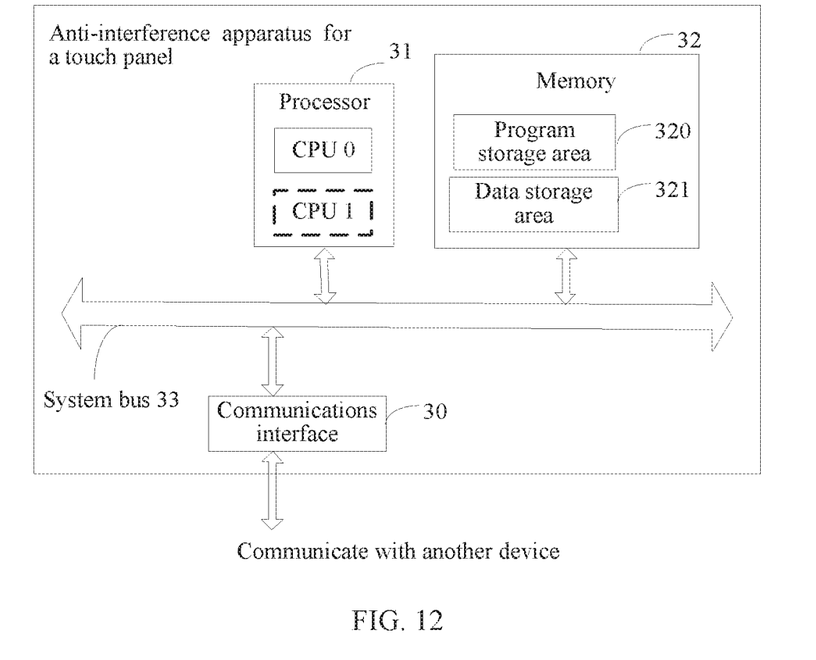
FIG. 12 is a third schematic structural diagram of an anti-interference apparatus for a touch panel according to an embodiment of the present invention.

When the processing module 20 is a processor, the communications module 21 is a communications interface, and the storage module 22 is a memory, the anti-interference apparatus for a touch panel in this embodiment of this application may be an anti-interference apparatus for a touch panel shown in FIG. 12.

As shown in FIG. 12, the anti-interference apparatus for a touch panel includes a communications interface 30, a processor 31, and a memory 32. The communications interface 30, the processor 31, and the memory 32 are connected and communicate with each other by using a system bus 33.

When running, the anti-interference apparatus for a touch panel performs the anti-interference method for a touch panel in the foregoing embodiment. For the specific anti-interference method for a touch panel, refer to related descriptions in the embodiments shown in FIG. 2, FIG. 3, FIG. 4. FIG. 6, FIG. 8, and FIG. 9. Details are not described herein again.

The communications interface 30 is configured to communicate with another device or a communications network such as an Ethernet or a WLAN.

The memory 32 may be configured to store the low-noise interval and the low-noise frequency that are mentioned in the foregoing embodiment, and may further be configured to store a software program and an application module. The processor 31 runs the software program and the application module that are stored in the memory 32, to implement various functional applications and data processing of the anti-interference apparatus for a touch panel.

The memory 32 may mainly include a program storage area 320 and a data storage area 321. The program storage area 320 may store an operating system and an application program required by at least one function. The data storage area 321 may store the low-noise interval and the low-noise frequency that are mentioned in the foregoing embodiment.

The memory 32 may be a read-only memory (Read-only Memory, ROM) or another type of static storage device that can store static information and an instruction, or a random access memory (Random Access Memory, RAM) or another type of dynamic storage device that can store information and an instruction, or may be an electrically erasable programmable read-only memory (Electrically Erasable Programmable Read-Only Memory, EEPROM), a magnetic disk storage medium or another magnetic storage device, or any other medium that can be configured to carry or store expected program code in a form of an instruction or a data structure and that can be accessed by the anti-interference apparatus for a touch panel. The present invention is not limited thereto.

The memory 32 may exist independently, and is connected to the processor 31 by using the system bus 33. Alternatively, the memory 32 may be integrated with the processor 31.

The processor 31 is a control center of the anti-interference apparatus for a touch panel. The processor 31 is connected to various parts of the entire anti-interference apparatus for a touch panel by using various interfaces and lines. By running or executing the software program and/or the application module stored in the memory 32, and invoking data stored in the memory 32, the processor 31 performs various functions of the anti-interference apparatus for a touch panel and data processing, thereby performing overall monitoring on the anti-interference apparatus for a touch panel.

During specific implementation, in an embodiment, the processor 31 may include one or more CPUs. For example, the processor 31 in FIG. 12 includes a CPU 0 and a CPU 1.

The system bus 33 may be classified into an address bus, a data bus, a control bus, and the like. In this embodiment of this application, for the purpose of clear description, various buses are marked as the system bus 33 in FIG. 12.

This embodiment of the present invention provides the anti-interference apparatus for a touch panel. The low-noise interval and/or the low-noise frequency is calculated by using the operating frequency of the charging adapter and the jitter frequency of the charging adapter, so that when an amplitude of common mode noise of a current operating frequency is excessively large, the touch panel can directly switch the operating frequency of the touch panel to the low-noise frequency in the low-noise interval, thereby improving accuracy of switching the operating frequency by the touch panel.

The foregoing descriptions about implementations allow persons skilled in the art to understand that, for the purpose of convenient and brief description, division of the foregoing functional modules is taken as an example for illustration. In actual application, the foregoing functions can be allocated to different modules and implemented based on a requirement, that is, an inner structure of an apparatus is divided into different functional modules to implement all or part of the functions described above. For a detailed working process of the foregoing system apparatus, and unit, reference may be made to a corresponding process in the foregoing method embodiments, and details are not described herein again.

In the several embodiments provided in this application, it should be understood that the disclosed system, apparatus, and method may be implemented in other manners.

For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium.

Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An anti-interference method for a touch panel, comprising:
   obtaining an operating frequency of a charging adapter;
   obtaining a jitter frequency of the charging adapter;
   identifying that interference to the touch panel exceeds a preset range;
   determining a low-noise interval in which the touch panel is to operate based on the operating frequency and jitter frequency of the charging adapter; and
   switching an operating frequency of the touch panel to a frequency in the low-noise interval in response to identifying that the interference to the touch panel exceeds the preset range, and wherein the low-noise interval is a frequency interval in which the touch panel is to operate when the interference to the touch panel is within the preset range.

2. The anti-interference method of claim 1, wherein after determining the low-noise interval in which the touch panel is to operate, the anti-interference method further comprises selecting, from the low-noise interval, a low-noise frequency at which the touch panel is to operate.

3. The anti-interference method of claim 2, wherein after the low-noise interval is determined, the anti-interference method further comprises sending the low-noise frequency to the touch panel.

4. The anti-interference method of claim 1, wherein the charging adapter operates at a fixed frequency and in a frequency jittering mode, wherein determining the low-noise interval comprises calculating, using a first formula based on the operating frequency of the charging adapter and the jitter frequency, the low-noise interval in which the touch panel is to operate, wherein the first formula is $w_p = f - (2n+1)\Delta f$, wherein $w_p$ is the low-noise interval, wherein f is the operating frequency of the charging adapter, wherein $\Delta f$ is the jitter frequency, and wherein n is a positive integer.

5. The anti-interference method of claim 1, wherein the charging adapter operates in a valley conduction mode, wherein determining the low-noise interval comprises calculating, using a second formula based on the operating frequency of the charging adapter and the jitter frequency, the low-noise interval in which the touch panel is to operate, wherein the second formula is $w_p = f - (n+1)\Delta f$, wherein $w_p$ is the low-noise interval, wherein f is the operating frequency of the charging adapter, wherein $\Delta f$ is the jitter frequency, and wherein n is a positive integer.

6. The anti-interference method of claim 1, wherein obtaining the operating frequency of the charging adapter and obtaining the jitter frequency comprises receiving the operating frequency of the charging adapter and the jitter frequency from the charging adapter.

7. The anti-interference method of claim 1, wherein after determining the low-noise interval, the anti-interference method further comprises sending the low-noise interval to the touch panel.

8. An anti-interference apparatus for a touch panel, comprising:
   a system bus;
   a memory coupled to the system bus and configured to store a computer instruction; and
   a processor coupled to the system bus and the memory, wherein the computer instruction causes the anti-interference apparatus to be configured to:
      obtain an operating frequency of a charging adapter;
      obtain a jitter frequency of the charging adapter;
      determine a low-noise interval in which the touch panel is to operate based on the operating frequency and jitter frequency of the charging adapter; and
      switch an operating frequency of the touch panel to a frequency in the low-noise interval when an interference to the touch panel exceeds a preset range, and wherein the low-noise interval is a frequency interval in which the touch panel is to operate when the interference to the touch panel is within the preset range.

9. The anti-interference apparatus of claim 8, wherein after the low-noise interval is determined, the computer instruction further causes the anti-interference apparatus to be configured to select, from the low-noise interval, a low-noise frequency at which the touch panel is to operate.

10. The anti-interference apparatus of claim 9, wherein the anti-interference apparatus is disposed in the charging adapter, and wherein after the low-noise interval is determined, the computer instruction further causes the anti-interference apparatus to be configured to send the low-noise frequency to the touch panel.

11. The anti-interference apparatus of claim 8, wherein the charging adapter operates at a fixed frequency and in a frequency jittering mode, and wherein to determine the low-noise interval, the computer instruction further causes the anti-interference apparatus to be configured to calculate, using a first formula based on the operating frequency of the charging adapter and the jitter frequency, the low-noise interval in which the touch panel is to operate, wherein the first formula is $w_p = f - (2n+1)\Delta f$, wherein $w_p$ is the low-noise interval, wherein f is the operating frequency of the charging adapter, wherein $\Delta f$ is the jitter frequency, and wherein n is a positive integer.

12. The anti-interference apparatus of claim 8, wherein the charging adapter operates in a valley conduction mode, and wherein to determine the low-noise interval, the computer instruction further causes the anti-interference apparatus to be configured to calculate, using a second formula based on the operating frequency of the charging adapter and the jitter frequency, the low-noise interval in which the touch panel is to operate, wherein the second formula is $w_p = f - (n+1)\Delta f$, wherein $w_p$ is the low-noise interval, wherein f is the operating frequency of the charging adapter, wherein $\Delta f$ is the jitter frequency, and wherein n is a positive integer.

13. The anti-interference apparatus of claim 8, wherein the anti-interference apparatus is disposed in an electronic device, and wherein to obtain the operating frequency of the charging adapter and obtain the jitter frequency, the computer instruction further causes the anti-interference apparatus to be configured to receive the operating frequency of the charging adapter and the jitter frequency of the charging adapter from the charging adapter.

14. The anti-interference apparatus of claim 8, wherein the anti-interference apparatus is disposed in the charging adapter, and wherein after the low-noise interval is determined, the computer instruction further causes the anti-interference apparatus to be configured to send the low-noise interval to the touch panel.

15. A non-transitory computer readable storage medium having computer usable program code, wherein a computing device executes the computer usable program code to:
   obtain an operating frequency of a charging adapter;
   obtain a jitter frequency of the charging adapter;
   determine a low-noise interval in which a touch panel is to operate based on the operating frequency and jitter frequency of the charging adapter; and
   switch an operating frequency of the touch panel to a frequency in the low-noise interval when an interference to the touch panel exceeds a preset range, and wherein the low-noise interval is a frequency interval in which the touch panel is to operate when the interference to the touch panel is within the preset range.

16. The non-transitory computer readable storage medium of claim 15, wherein after the low-noise interval is determined, the computing device further executes the computer usable program code to select, from the low-noise interval, a low-noise frequency at which the touch panel is to operate.

17. The non-transitory computer readable storage medium of claim 16, wherein after the low-noise interval is determined, the computing device further executes the computer usable program code to send at least one of the low-noise interval or the low-noise frequency to the touch panel.

18. The non-transitory computer readable storage medium of claim 15, wherein the charging adapter operates at a fixed frequency and in a frequency jittering mode, and wherein to determine the low-noise interval, the computing device further executes the computer usable program code to calculate, using a first formula based on the operating frequency of the charging adapter and the jitter frequency, the low-noise interval in which the touch panel is to operate, wherein the first formula is $w_p = f - (2n+1)\Delta f$, wherein $w_p$ is the low-noise interval, wherein f is the operating frequency of the charging adapter, wherein $\Delta f$ is the jitter frequency, and wherein n is a positive integer.

19. The non-transitory computer readable storage medium of claim 15, wherein the charging adapter operates in a valley conduction mode, and wherein to determine the low-noise interval, the computing device further executes the computer usable program code to calculate, using a second formula based on the operating frequency of the charging adapter and the jitter frequency, the low-noise interval in which the touch panel is to operate, wherein the second formula is $w_p = f - (n+1)\Delta f$, wherein $w_p$ is the low-noise interval, wherein f is the operating frequency of the charging adapter, wherein $\Delta f$ is the jitter frequency, and wherein n is a positive integer.

20. The non-transitory computer readable storage medium of claim 15, wherein to obtain the operating frequency of the charging adapter and obtain the jitter frequency, the computing device further executes the computer usable program code to receive the operating frequency of the charging adapter and the jitter frequency of the charging adapter from the charging adapter.

\* \* \* \* \*